April 11, 1967  G. W. RICHARDSON ET AL  3,313,919
COOKING APPARATUS WITH COOKING VESSEL
CENTERING AND HOLDING MEANS
Filed June 26, 1964
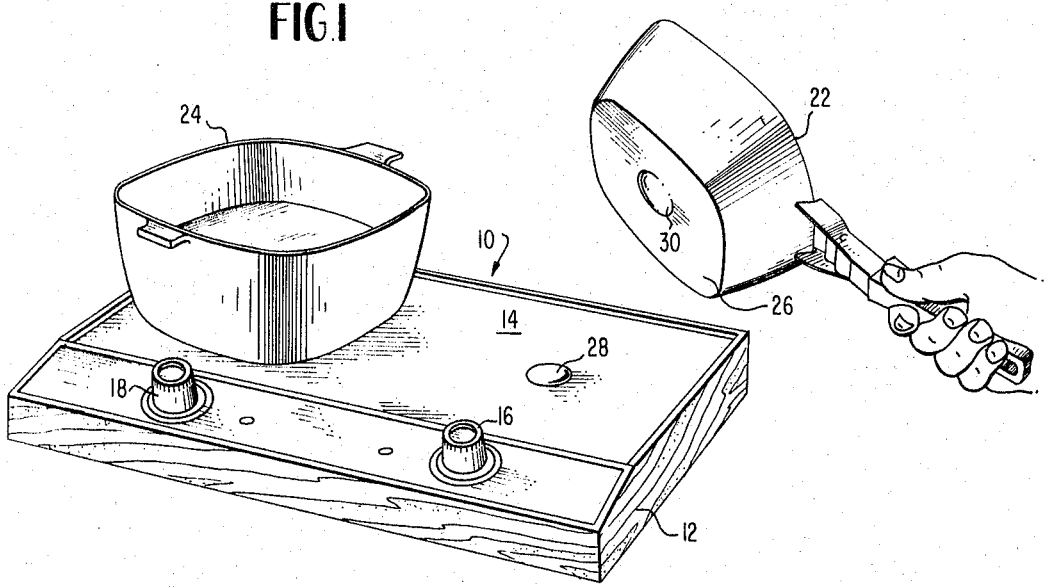
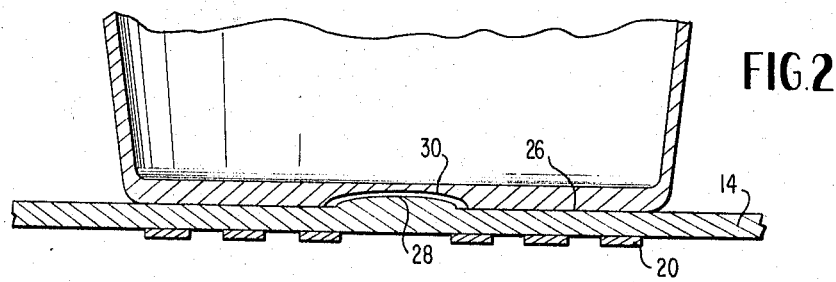
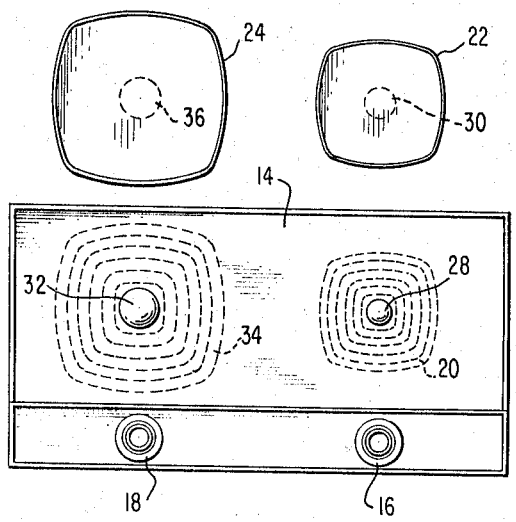
INVENTORS
GEORGE W. RICHARDSON
JERRY E. WRIGHT
BY
Sughrue, Rothwell, Mion & Zinn
ATTORNEYS 3,313,919
COOKING APPARATUS WITH COOKING VESSEL CENTERING AND HOLDING MEANS
George W. Richardson and Jerry E. Wright, Corning, N.Y., assignors to Corning Glass Works, Corning, N.Y., a corporation of New York
Filed June 26, 1964, Ser. No. 378,169
3 Claims. (Cl. 219—433)

This invention relates to improvements in electrically heated cooking apparatus having means for centering and holding cooking vessels thereon.

In one well-known type of electrically heated cooking apparatus the cooking surface is a very smooth and polished glass-ceramic surface, known by the trademark "Pyroceram," and the heating elements are positioned beneath this surface. In fact, more than one heating element may be used for different areas of the polished glass-ceramic surface in order to furnish the equivalent of two or more electric heating areas for two or more separate cooking vessels. These smooth glass-ceramic cooking surfaces are especially constructed to cooperate with a cooking vessel of the same glass-ceramic material having a smooth flat polished bottom surface. The electrically heated cooking apparatus includes an adjustable thermostat control which is especially constructed for use with the flat bottomed glass-ceramic cooking vessels in combination with the flat glass-ceramic surface thus eliminating any air gap which would form a thermal barrier between these surfaces. This prevention of an air gap and variable thermal barrier is one reason that the cooking surface and bottom of the cooking vessel are both flat and smooth.

However, while allowing for very good thermal sensing and thermostat control, using a glass-ceramic cooking surface and glass-ceramic cooking vessel both having smooth polished glass mating surfaces, does allow the cooking vessel to slide quite easily on the cooking surface due to the low coefficient of friction therebetween. This problem has been solved in the past by using a cooking surface not much larger than the cooking vessel together with racks, protrusions, or rims around the edge of the cooking surface for holding the vessel from undue sliding and centering it above the heated portion of the cooking surface.

It is desirable, however, to provide a plural "burner" surface having several heated areas. If the entire surface of the cooking apparatus is smooth flat glass-ceramic, any slight force on a vessel centered over one of the burners would cause it to slide or "skate" off the center of the burner or heated area and the heating would be ineffective, uncontrolled and a nuisance to the correct operation of the utensil.

In addition, using a heating surface with at least two heating elements forming two separate heated areas of different size, it is desirable to use cooking vessels related in their design to the size of the cooking surface.

Moreover, due to the fact that the thermostat is especially constructed for operation with a glass-ceramic cooking surface and a glass-ceramic cooking vessel in intimate relationship with no air gap, it is essential for effective operation that "foreign" vessels, that is vessels which are not glass-ceramic having the same thermal coefficients, and all vessels which do not have a polished bottom to make complete contact and prevent an air gap should be rejected and should not be used with the cooking surface.

In view of the foregoing, the objects of this invention are to provide an electrically heated polished glass-ceramic cooking surface of a relatively large area to be used with glass-ceramic cooking vessels having cooperating polished bottoms thereon in which the vessels are prevented from sliding or skating on the cooking surface, and in which the vessels are centered over the heating element, and in which the vessels may be used only with the heating elements of the cooking surface with which they will not overheat or perform improperly, and finally to prevent the use of vessels for which the cooking surface was not designed to operate.

Other objects of the invention will be pointed out in the following description and claims and illustrated in the accompanying drawing, which discloses, by way of example, the principle of the invention and the best mode which has been contemplated of applying that principle.

In the drawing:

FIG. 1 is a perspective view of the electrically heated cooking apparatus and cooking vessels showing the centering and holding means of this invention.

FIG. 2 is a sectional elevation view taken through a portion of the cooking apparatus and cooking vessels showing the centering and holding means of this invention in operation.

FIG. 3 is a schematic plan view of the cooking apparatus and cooking vessels showing the centering and holding means therefor and the arrangement by which small cooking vessels cannot be overheated by being used on too large a cooking area.

Referring now to the drawing, the electrically heated cooking apparatus 10 of this invention includes a support 12 mounting a glass-ceramic cooking surface which may be of "Pyroceram" or the equivalent and has a relatively large surface which is flat and polished to a smooth finish. The cooking apparatus 10 includes a pair of separate heated areas of different size which are controlled by adjustable thermostatic controls 16 and 18. These controls control separate heating units such as heating element 20 shown in FIG. 2 as positioned below the cooking surface 14.

Special cooking vessels 22 and 24 as illustrated in FIG. 1, as well as other sizes and shapes of the usual cooking vessels, are specially constructed and adapted for use with the cooking apparatus 10. Forming part of this special construction is the fact that the cooking vessels are also formed from a glass-ceramic such as "Pyroceram" or equivalent and that they have a flat very smooth surface such as flat bottom surface 26 of vessel 22 shown in FIGS. 1 and 2.

With the flat and cooperating surface 26 resting on mating cooperating surface 14 there is no air gap between these surfaces and they are in intimate contact as shown in FIG. 2. Suitable sensing means (not shown) for the thermostatic controls are thus able to effectively operate without substantial lag or variation due to a thermal barrier caused by an air gap between the surfaces. However, as the surfaces are quite smooth and there is a very low coefficient of friction therebetween, just applying a small force or tilting of the cooking apparatus 10 causes the vessel to slide or skate on the smooth cooking surface 14 and it can very easily move off of the heated area over the heating element 20 for example.

In order to solve this and other problems, this invention provides a circular button 28 protruding from the surface 14 and, as shown in FIG. 3, substantially centered within the heated area defined by the heating element 20 below the glass-ceramic cooking surface 14. A circular depression 30 is formed in the center of the flat bottom surface 26 of vessel 22 for cooperating with the circular button 28. Thus, the depression 30 is complementary to button 28 and is somewhat slightly larger in size due to manufacturing tolerances. It can thus be seen when the vessel 22 of FIG. 1 is set down on the cooking surface 14 that the depression 30 centered over the button 28 the vessel 22 will likewise be centered over the heated area defined by heating element 20, see FIG. 3, and the cooperating button and depression will prevent the vessel 22 from sliding or skating about the surface. Because the button is circular it will allow the vessel 22 to be rotated to grasp the handle or for other purposes. Moreover, because the button 28 protrudes from surface 14 ordinary cooking vessels cannot be used, and they are not intended to be used due to the thermostatic control arrangement, with the special glass-ceramic cooking surface 14. Thus, the entire cooking apparatus can better perform as intended by the manufacturer. As can be seen in FIG. 2 the diameter and depth of depression 30 is larger than the diameter and height of button 28. Because of this arrangement the protruding button 28 does not engage, and thus does not support, any of the weight of the cooking vessel and the flat bottom surface 26 of vessel 22 is in tight face to face mating relationship with the cooking surface 14. Furthermore, with this construction as shown in FIG. 2, point loading on the button is prevented.

As can be seen in FIG. 1, the cooking surface 14 is large enough to support two different vessels 22 and 24 over two separate heated areas. These areas are shown better in FIG. 3 in which the electric heating elements therefor, heating element 20 and a larger heating element 34, are shown in dotted lines since they are beneath the surface 14. It is noted, however, that one of the heated surfaces is larger than the other and the entire surface area 14 has at least two different heated surfaces for at least two different cooking vessels 22 and 24. A circular button 32 is provided for the heated surface above heating element 34 and is centered in this heated area. Similarly, a complementary and slightly larger circular depression 36 is formed in the bottom of cooking vessel 24 as shown in dotted lines in FIG. 3.

With the arrangement of FIG. 3, it can be seen that the smaller cooking vessel 22 can easily be set on a cooking surface 14 and centered and held above the heated area defined by the heating element 20 and can be rotated thereon but will not slide off of this heated area. If, however, the cooking vessel were attempted to be set on the larger heated area above heating element 34 it would not set down flat due to the fact that the larger circular button 32 centered within the heated area defined by heating element 34 is too large for circular depression 30. This is especially useful to prevent the glass-ceramic cooking surface from being overheated or performing improperly by the larger heating element, and for causing the elements to be properly mated to the desired size cooking vessel. The larger cooking vessel 24 fits over the larger cooking area above heating element 34 and could, if desired, fit over the smaller heated area above heating element 20 when performance is not a factor.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, the heating elements may be gas heating units rather than electric heating elements. It is the intention, therefore, to be limited only as indicated by the scope of the following claims.

What is claimed is:

1. The combination of a ground and polished glass-ceramic flat and slippery smooth cooking surface having at least one heating unit positioned below said surface for heating only a portion of the surface and having adjustable thermostat control therefor especially constructed for use with special glass-ceramic cooking vessels having ground and polished flat and slippery smooth bottoms to prevent any thermal air barrier gap between the cooking surface and the bottom of the cooking vessel, the cooking surface having a much larger total area than the bottom of a cooking vessel to be used therewith, the heated portion of the cooking surface having an area much less than the total area of the cooking surface, at least one glass-ceramic cooking vessel having a ground and polished flat and slippery smooth bottom for cooperating with the ground and polished flat and slippery smooth cooking surface, the coefficients of friction between the vessel bottom and cooking surface being such that the vessel tends to skate or slip on the surface unless positively prevented from so doing, the cooking surface including a circular button protruding therefrom, the button being located in the center of the heated portion of the cooking surface, the bottom of the cooking vessel being substantially the same size as the heated portion of the cooking surface, and the bottom of the cooking vessel including a circular depression generally complementary to the circular button, but slightly larger in diameter and depth than the diameter and height of the circular button so that the protruding button does not engage and thus does not support any of the weight of the cooking vessel, the circular depression located centrally of the bottom of the vessel cooperating with the button to prevent sliding and skating of the vessel on the cooking surface and to center the vessel on the heated surface portion of the cooking surface.

2. The combination as defined in claim 1 wherein the heating element is an electric heating element.

3. The combination of a heated flat and smooth cooking surface having at least two laterally spaced electric heating units of different size therein for heating separate different size portions of the cooking surface with adjustable thermostat control therefor especially constructed for use with special cooking vessels having flat and smooth bottoms to prevent any thermal barrier air gap between the cooking surface and bottom of the cooking vessel, the entire cooking surface having a larger area than any one cooking vessel bottom to be used therewith so that at least two cooking vessels can be accommodated thereon in side by side relationship, at least two cooking vessels each having a flat and smooth bottom of different size corresponding to the different size heating units for cooperation with the different size heated portions of the flat and smooth cooking surface, the cooking surface including at least two circular buttons protruding above the cooking surface, each button located in the center of each of the different size heated portions of the cooking surface, with the largest diameter button located in the center of the largest heated portion of the cooking surface and the smallest diameter button located in the center of the smallest heated portion of the cooking surface, the bottoms of the cooking vessels each including a circular depression of different diameters located centrally in the bottoms of the vessels, the vessel bottom with the largest diameter circular depression being of a size to mate with the largest heated portion and the depression being generally complementary to the largest circular button, the vessel bottom with the smallest diameter circular depression being of a size to mate with the smallest heated portion and the depression being generally complementary to the smallest circular button, the diameter of the smallest depression being less than the diameter of the largest button so that the smaller of the two different size vessel bottoms cannot be set over the largest heated portion and allow tight face to face contact of the smaller vessel bottom with the larger of the heated portions of the cooking surface.

References Cited by the Examiner

UNITED STATES PATENTS

| | | | |
|---|---|---|---|
| 1,485,153 | 2/1924 | Wolcott | 219—143 |
| 1,711,472 | 4/1929 | Lewin | 219—460 |
| 1,871,705 | 8/1932 | Kevl | 219—445 |
| 2,078,650 | 4/1937 | Clark | 219—450 X |
| 2,091,394 | 8/1937 | Park | 220—23.4 X |
| 2,693,523 | 11/1954 | McCormick | 219—443 |
| 2,978,564 | 4/1961 | Blanding et al. | 219—459 |

FOREIGN PATENTS

| | | |
|---|---|---|
| 670,318 | 1/1939 | Germany. |
| 11,630 of 1912 | 5/1913 | Great Britain. |

ANTHONY BARTIS, *Primary Examiner.*